Oct. 11, 1927.

E. J. BLAKE 1,645,411

TURBINE GENERATOR SET

Filed May 16, 1924     4 Sheets-Sheet 1

Fig.1.

Inventor
Eli J. Blake
By his Attorneys
Ward, Crosby + Smith

Oct. 11, 1927.  
E. J. BLAKE  
TURBINE GENERATOR SET  
Filed May 16, 1924

Inventor  
Eli J. Blake  
By his Attorneys  
Ward Crosby + Smith

Patented Oct. 11, 1927.

1,645,411

UNITED STATES PATENT OFFICE.

ELI J. BLAKE, OF BUFFALO, NEW YORK, ASSIGNOR, BY MESNE ASSIGNMENTS, TO GOULD CAR LIGHTING CORPORATION, OF NEW YORK, N. Y., A CORPORATION OF MARYLAND.

TURBINE GENERATOR SET.

Application filed May 16, 1924. Serial No. 713,701.

My invention relates to improvements in turbine generator sets and more especially to turbine generator sets adapted to be placed on locomotives to be supplied with steam therefrom and to furnish electric current for the locomotive cab lights, headlights, etc.

The main object of the invention is to provide a turbine generator set which is more simple and efficient in operation and construction and which is easily assembled and disassembled for repair and replacement and which is nevertheless very compact. Further and more specific objects, features and advantages will more clearly appear from the detail description below taken in connection with the accompanying drawings which form a part of this specification.

Figure 1:
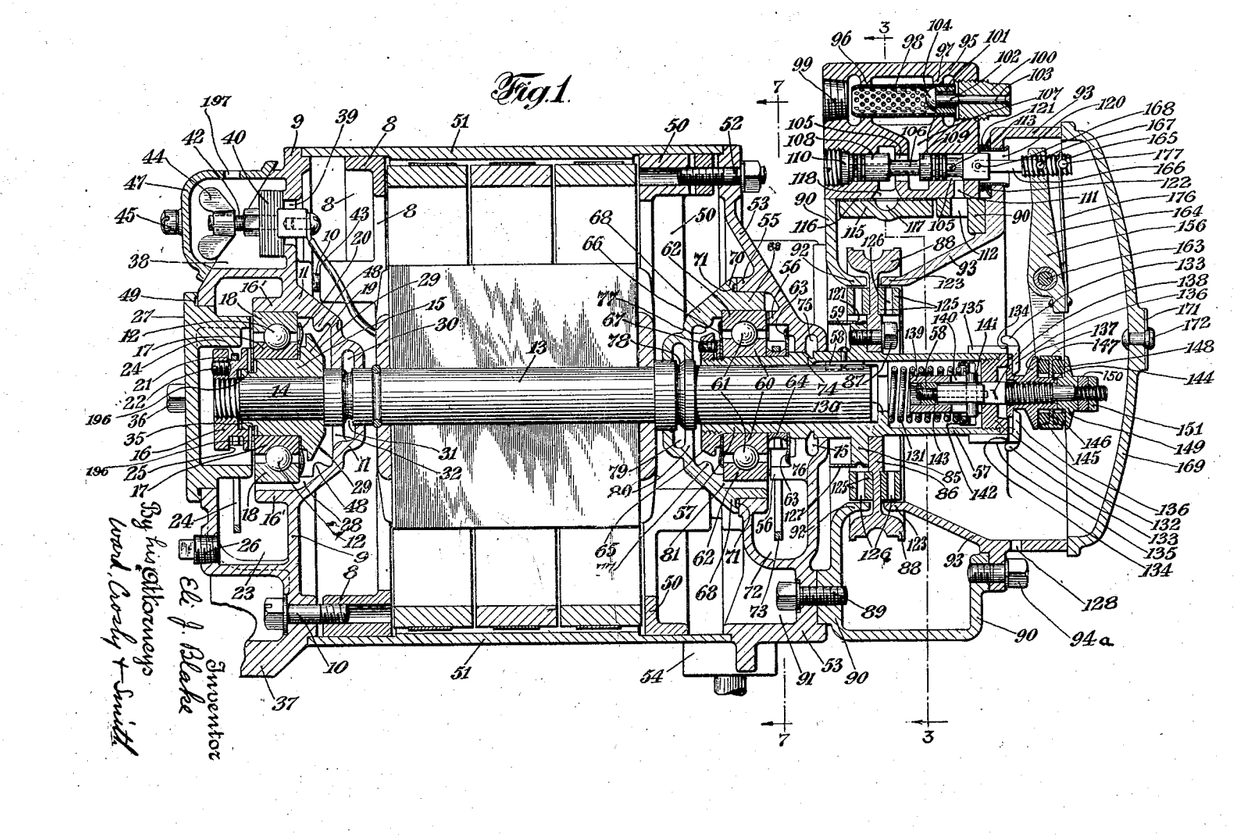
Fig. 1 is a vertical section through a turbine generator set embodying my improvements in a preferred form thereof.

Referring to the drawings 8 represents an end frame piece of a generator of the class shown in U. S. Patent No. 1,420,076 granted June 30, 1922. The generator is provided with an end plate 9 bolted to the framework 8 as by bolts 10. The plate 9 is centrally recessed to provide a supporting housing 11 for the bearing 12 which may be of the rolling type and is preferably a commercial ball bearing. The bearing 12 acts as a support for one end of the horizontal generator shaft 13. At this end the shaft 13 is reduced in diameter at 14 and a sleeve 15 is placed on this reduced portion which sleeve abuts against a shoulder on the shaft and is firmly held thereagainst by a nut 16 screwed on the end of the shaft 13.

Between the sleeve 15 and a circular flange 16' on the plate 9, are raceways 17 and 18 for the balls of the bearing 12. The sleeve 15 is provided with an enlarged head 19 and between the head 19 and raceway 18 is placed a washer like disc 20 which overlaps the space between the raceways 17 and 18 on one side thereof. The inside of the nut 16 bears against the other side of the raceway 17 to firmly hold the bearings against axial movement on the sleeve 15 and shaft 13. The nut 16 is split vertically through about half of its diameter as indicated at 21 and a screw 22 is screw threaded into the outer side to bear against the inner side of the split portion of the nut to spring the split portions apart and thus jam the threads and so lock the nut in place on the shaft 13.

The plate 9 is provided with an oil well or reservoir at 23 into which dips a ring 24 riding in a circular groove 25 in the periphery of the nut 16 so that as the nut 16 revolves with the shaft 13 the ring 24 is rotated and carries up oil from the well 23 and throws it upwardly to the bearing 12. The oil well 23 is provided with a drainage opening at the bottom normally closed by the screw plug 26. A cap plate frame piece 27 is bolted to the outside of the plate 9 by bolts 36 to completely enclose the roller bearings and associated parts. The cap plate 27 is provided with a packing groove 49 adjacent the outer face of the plate 9. Any oil leaking over the outside of the nut 16 tends to run back to the oil well 23. The disc 20 tends to prevent oil leaking from the bearing on the inside thereof but some oil may leak past the same and over the inner end of the sleeve 15. The inner end of the sleeve 15 is provided with a truncated conical face 29 which, by centrifugal action tends to throw any oil leaking over the same back toward the bearing and a circular ridge 48 on the inside of the recess tends to prevent it travelling inwardly over the face of the plate 9 and reaching the shaft 13 and causes the oil to be run down and return to the oil well through channel 28. Some oil may, however, reach the shaft 13 and tend to leak along the shaft. For the purpose of returning such oil to the oil well the plate 9 is provided with a circular recess at 30 and the shaft 13 is grooved at 31 opposite this recess so that oil flowing along the shaft will be caught in the recess 31 and thrown from its sides into the recess 30 from which it flows through channels 32 and 28 back to the oil well 23. Oil may be supplied to the oil well through an oil feed pipe 33 entering the side of the oil well (see Fig. 6). The pipe 33 is normally closed by a screw cap 34.

The sleeve 15 is provided with circumferential groove 35 into which extends the end of a radial pin 196 secured in the inner side of the nut 16. To remove the bearing for examination, repair or replacement, the cap plate 27 is first removed and then the screw 22 is unloosened to unlock the nut 16. Then the nut 16 is screwed off the shaft 13 and by reason of said pin engaging the groove 35 the unscrewing of the nut 16 pulls the sleeve 15 off the shaft with it, thereby also removing the roller bearings 12 and raceways 17 and 8 from the bearing supporting recess in the plate 9. By then removing said pin from the nut 16 all the parts may be quickly and easily disassembled. The frame plate 9 and cap plate 27 form an efficient enclosing and supporting housing for the bearing.

Figure 6:
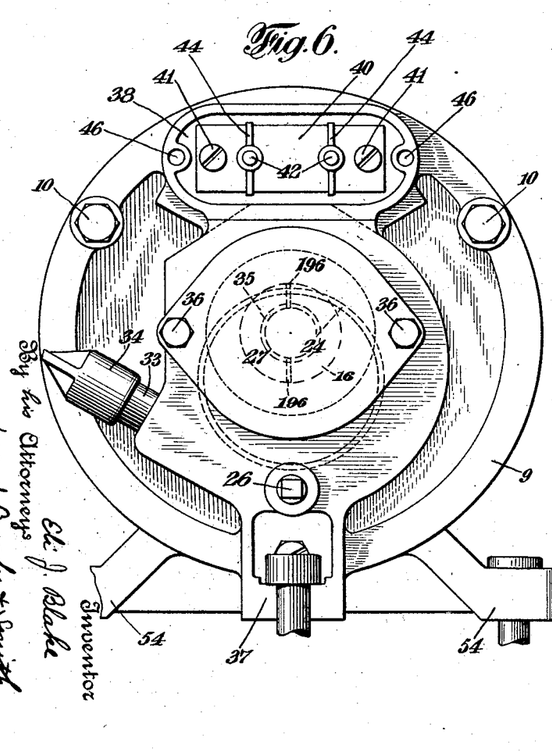
Fig. 6 is an end view of the generator end of the apparatus and Fig. 7 is a section taken on the line 7—7 of Fig. 1.

The frame piece 9 is provided with a slotted foot 37 (see also Fig. 2) by means of which the same may be bolted to a suitable base such as the top of a locomotive. The frame plate 9 is also provided with a recess at 38 and an opening through the base of this recess at 39. Extending over the outside of this opening is a block of insulating material 40 screwed to the frame plate by screws 41. The block 4 is apertured to receive and support electrical contact screw bolts 42 to the inner ends of which are connected generator leads 43 leading to the stator armature windings of the generator. Wing nuts 44 on the outer ends of the screw bolts 42 permit of easy connection for leads to the lighting circuit. A cap plate or cover 47 is secured on the plate 9 by screws 45 passing therethrough and engaging screw threaded holes 46 in the plate 9. This cover makes the enclosure of the contact terminals substantially complete. The recess is provided with openings 197 through which the leads to the lighting circuit from the terminal contacts may pass.

The opposite end of the generator is provided with a frame piece 50. The frame pieces 8 and 50 are firmly held in position with the field magnets of the generator therebetween by any suitable means (not shown). An encircling band 51 encloses the periphery of the generator.

Figure 7:
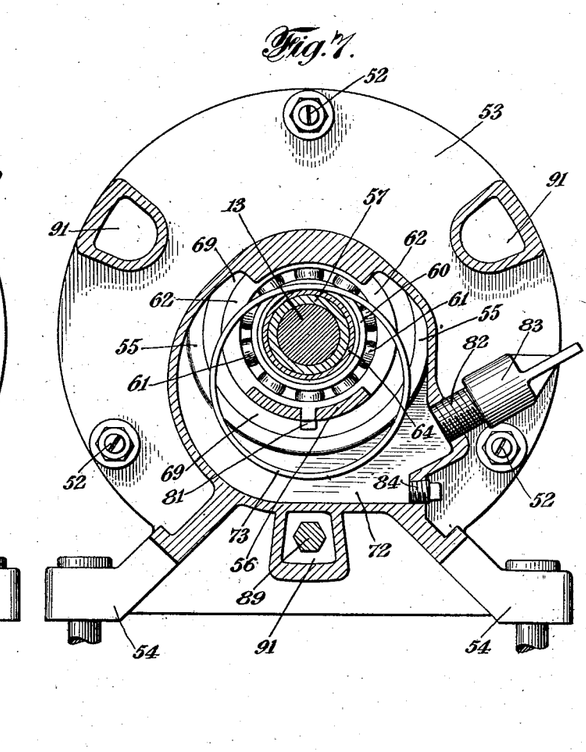

Bolted to the frame piece 50 by screw bolts 52 is an end frame plate 53 provided with projecting slotted feet 54 adapted to be bolted to the locomotive or other base. The plate 53 is provided with a central recessed portion having a circular flange 55 and bosses 56 extending around the same. The plate 53 is also centrally apertured to provide an opening through which the shaft 13 extends. 57 represents a sleeve (see also Fig. 7) extending over this end of the shaft 13. The shaft 13 is provided with a horizontal keyway extending to the end of the shaft in which keyway is located a key 58 secured to the sleeve 57 by a screw 59, whereby the sleeve 57 is rotated by the generator shaft 13 but is freely movable axially thereon. The sleeve 57 extending through the plate 53 carries the bearing 61 which may be of the rolling type and is preferably a commercial ball bearing in which 60 and 62 are relatively the inner and outer raceways. Just inside the plate 53 the sleeve 57 is provided with a shoulder against which is held an oil barrier disc 63 similar to the disc 20 on the other end. Adjacent the disc 63 a grooved ring 64 surrounds the sleeve and adjacent this grooved ring 64 is the raceway 60. On the other side of the raceway 60 a nut 65 is screwed up on the sleeve 57 in order to hold the disc 63, ring 64 and raceway 60 firmly in position on the sleeve, another oil retaining circular disc 66 being interposed between the raceway 60 and the nut 65. The nut 65 is split vertically for about half its width and a set screw 67 operates in one of the split parts and against the other to lock the nut in place on the sleeve.

Secured to the frame plate 53 by screws (not shown) is a cap frame piece 68 provided with a circular flange 69 fitting adjacent the inside of flange 55 and an overlapping part 70 bearing against the face of the flange 55 and provided with a packing groove 71. The plate 53 is provided with an oil well or reservoir at 72 into which dips an oil ring 73 riding on the grooved ring 64 for transferring oil from the reservoir 72 up to the bearings 61 operating in substantially the same manner as the ring 24 at the other end of the generator. The disc 63 tends to prevent oil from flowing outwardly along the sleeve 57. Should, however, any oil get by the disc 63 and travel along the sleeve 57 it will be caught in a groove 74 in the sleeve and thrown therefrom by centrifugal action from the sides of the groove into a circular groove 75 in the frame piece 53 and run back to the oil well through a channel 76. Should oil escape by the disc 66 on the other side of the bearing and tend to run over the nut 65 it, by reason of the frustroconical shape of the nut, will be thrown back by centrifugal action toward the roller bearings and will run down and back into the oil well 72 through channel 81. The circular ridge 77 tends to prevent the oil running along the inside face of the plate 68 to the shaft 13. Should, however, any oil run over this face and reach the shaft 13 and tend to travel along the shaft toward the inside of the dynamo it will be caught in a groove 78 in a circular boss on the shaft and will be thrown by centrifugal action into a circular groove 79 in the cap plate 68 and caused to return to the oil well 72 through channels 80 and 81. Oil collecting beside the ridge 77 will also return to the oil well through channel 81. The oil well 72 is provided with a lateral opening in which is secured a pipe 82 (see Fig. 7) through which oil may be introduced into the oil well. This pipe is normally closed by a screw cap 83. The oil well 72 is also provided with a drainage opening at the bottom which opening is normally closed by a screw plug 84. To remove the bearings 61 and associated parts, it is only necessary to remove the plate 53 and parts carried thereby, by removing the nuts on bolts 52 and then taking off the cap plate 68 and unscrewing the nut 65 whereupon all parts of the bearing and oiling system may be conveniently slipped off the sleeve 57 for inspection, repair or replacement.

The sleeve 57 is provided with an integral centrally disposed flange 85 to which is rigidly secured the turbine wheel 86 by bolts 87. The turbine wheel 86 is provided with a steam impact rim 88. Rigidly secured to the frame plate 53 by bolts 89 is a turbine housing plate 90. The heads of bolts 89 are located in recesses 91 in the plate 53. The turbine housing member 90 is centrally provided with an integral circular flange 92 extending inwardly underneath and closely adjacent the rim 88 of the turbine wheel. The housing member 90 extends around the periphery of the turbine wheel, except at the top and a housing plate 93 is bolted to the outside thereof by bolts 94ª.

Secured to the top of the housing member 90 by bolts 94 is a valve housing 95. The valve housing is provided with a longitudinal bore at its top having inwardly extending circular flanges 96 and 97 supporting a cylindrical steam strainer 98. One end of the bore is screw threaded at 99 for attachment of a steam supply pipe. At the other end the bore is screw-threaded to accommodate a screw plug 100 which substantially closes the bore at that end. Rigidly secured in the same end of the strainer 98 is a thick sleeve 101, through which loosely passes a pin 102 having a reduced portion 103 firmly riveted in the plug 100. On its inner end the pin 102 is provided with an integral head 104 to prevent the pin from slipping through the sleeve 101.

Below the said bore is another bore 105 in which is located a piston valve 106. The first mentioned bore is in communication with the bore 105 by a passageway 107. The valve 106 has a portion of reduced diameter centrally thereof forming two heads 108 and 109 at its ends. The head 108 is provided with two circumferential grooves on its outer end and at this end the bore 105 is closed by a screw plug 110 which forms an abutment for the end of the valve 106 when in its wide open position. The valve head 109 is also provided with a series of circumferential grooves for catching any steam which tends to escape around the valve head. Any steam which may escape around the valve head 109 and past the first two grooves will pass into the third and wider groove from which it is conducted into the turbine housing through passageways 111 and 112 in the valve housing 95 and turbine housing 90 respectively. The grooves on the valve head 108 catch any steam which may tend to escape by the same. The outer one of these grooves is connected by means of a radial hole with an axial bore in the valve 106 which bore extends through the head 108 and communicates with a hole 113 in the valve head 109 so as to also conduct leakage steam passing the valve head 108 to the interior of the turbine housing through the passageways 111 and 112.

Rigidly secured to the underneath side of the valve housing by bolts 114 is a nozzle 115 for the turbine wheel. A packing 116 is placed between the nozzle and valve housing and the nozzle is provided with a steam passage 117 communicating with a steam passage 118 in the valve housing whereby steam may pass from the valve and through the nozzle to operate the turbine wheel and drive the generator. The entering steam passes through the perforations in the strainer 98 to the space centrally around the same, thence through the passageway 107 and around the reduced portion of the valve 106 to the passageway 118 and into the nozzle. To regulate the steam admitted and thereby keep the speed of the turbine and generator substantially constant the valve 106 is moved axially to more or less close the passageway around the reduced portion of the valve. By moving the valve to the right as viewed in Fig. 1 the head 108 will close this passageway to the passageway 118 and thus shut off the supply of steam to the turbine. To remove the strainer 98 it is only necessary to unscrew the screw plug 100 whereupon the strainer will be pulled out with it by reason of its connection thereto through the sleeve 101 and headed pin 102. This makes it easy to remove the strainer for inspection, repair or replacement.

The valve head 109 extends slightly beyond the outer face of the valve housing and is surrounded by sleeve 120 spaced from the valve head fitted within an opening in the housing plate 93. The sleeve 120 has a ring 121 screw threaded on its inner end against which a spring washer 122 acts to hold the sleeve 120 against the face of the valve housing. The plate 93 is provided with a circular flange 123 extending under and adjacent to the rim of the turbine wheel whereby with the housing plate 90 and its flange 92, a housing chamber is provided for the turbine wheel which chamber has an opening therethrough, through which the axis of the shaft 13 extends and which opening is substantially larger in diameter than the shaft to provide space for the compact arrangement of the centrifugal governor mechanism hereinafter described. In order to prevent as far as possible the escape of steam from this turbine housing chamber through the circular slot opening in the housing chamber, between the flanges 92 and 103 and around the turbine wheel which extends radially therethrough, there are secured to the turbine wheel by bolts 124 (see Fig. 3) flat rings 125, two on each side of the wheel and each pair being separated by radial spacer members 126 which because of the intervening radial spaces and the resulting centrifugal effects create an air pressure on the outside of the slots between the flanges 92 and 123 and the turbine wheel and thus tend to prevent the escape of steam through said slots which would be directed toward the generator bearings and governor parts at this end of the apparatus. The rings 125 also have very small clearance with respect to the flanges 92 and 123 which further reduces steam leakage at this point. To divert any steam thus escaping toward such generator bearings away from the bearings and thus act as further protection, a cylindrical sleeve 127 is secured on the periphery of the flange 85 and extends toward the bearings. The housing member 93 is provided with an opening 128 to the outside atmosphere so that any steam escaping through the slot between the turbine wheel and flange 123 will be conducted to the outside atmosphere at a point away from the bearings.

Figure 5:
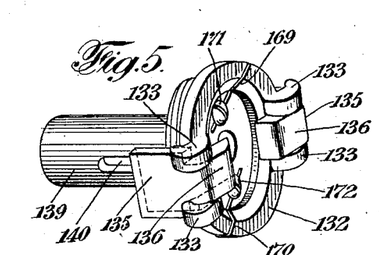
Fig. 5 is a perspective of some of the centrifugal governor parts.

The sleeve 57 is provided with an internal circular flange 130 forming an abutment for one end of a coiled compression spring 131 located in the outer end of the sleeve 57. Screwed into the outer end of the sleeve 57 is a centrifugal governor support 132 (see also Fig. 5) provided with two pairs of projecting ears 133 fulcrumed against which at 134, 134 are centrifugal weight members 135. That is, the members 135 are provided with shoulders extending under the pairs of ears 133 respectively and the outer edges of said shoulders form pivot points for the members 135 when they are swung outwardly by centrifugal action. The members 135 are provided with arms 136 respectively, which arms engage a collar on a member 137 screw-threaded on a spindle 138 mounted to slide centrally through the head of member 132. The member 132 is provided with an integral sleeve 139 slotted at 140. A pin 141 extends through a hole in the spindle 138 and through the slots 140 and its ends are of reduced diameter to engage a circular dished member 142 forming an abutment for the outer end of the spring 131. Extending axially of the pin 138 is a small pin 143. The pin 143 extends through a hole in pin 141 to prevent it from slipping laterally in its hole in spindle 138. The pin 143 has an enlarged screw threaded head on its inner end which is screwed into the inner end of the spindle 138 so that the pin 143 is held firmly in position. The coils of spring 131 surround the sleeve 139 and are enclosed in the end of sleeve 57.

In order to lock the member 132 firmly in the end of the sleeve 57 the head of the member 132 is split as at 169 and 170 (see Fig. 5) and screws 171 and 172 are adapted to be screwed into the split portions to slightly open up or spread apart the same and thus jam the screw-threaded portion of the head of the member 132 in the end of the sleeve 57 to firmly lock the same therein.

The member 137 is provided with a flat outer face from the center of which extends a sleeve portion 144. Bearing against said flat face and encircling said sleeve portion 144 is an anti-friction ring of carbon 145. Next to the carbon ring 145 and extending around the sleeve portion 144 is washer member 146 provided with a flanged periphery at 147. Next to the washer member 146 is another carbon ring 148. Next to the carbon ring 148 and located on a reduced end of the spindle 138 is circular member 149 having a flat face bearing against the carbon ring 148. The member 149 is held in position on the spindle 138 by nuts 150 and 151.

By revolving the thrust member 137 (when the nuts 150 and 151 are loosened) on the valve stem, which is restrained from revolving by the pin 141, the stem can be adjusted inward or outward to vary the spring compression and thereby the speed adjustment of the governor. When clamped up by the nuts 150, 151, the adjustment is locked.

Figure 4:
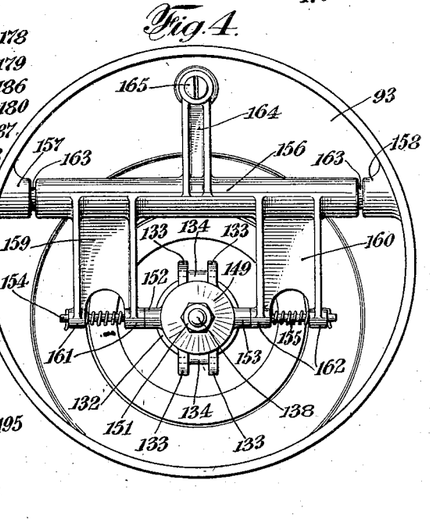
Fig. 4 is a detail view of the governor parts inside the turbine end of the apparatus.

The washer member 146 has two bosses 152 and 153 integral with the flange 147 thereof (see Fig. 4). The bosses 152 and 153 have extending therein pivot pins 154 and 155 respectively and pivotally connected to said pins is a lever member 156 journaled on an axle 163 supported in the housing member 93 at 157 and 158. The lever 156 is provided with two integral depending arms 159 and 160 each having two apertured lugs 161 and 162 respectively through which the pins 154 and 155 respectively pass to pivotally connect the lower ends of the downwardly extending arms 159 and 160 to the member 146. The lever 156 has an integral upwardly extending arm 164. Screwed into the upper end of the arm 164 is a screw 165. The screw 165 has an axial bore or slot in its inner end into which extends one end of a link 166 which link is pivoted in the bore by means of a pin 167. The other end of the link 166 is pivoted in a bore or slot in the end of the valve 106 by means of a pivot pin 168. The mechanism just described is located mostly within the turbine housing plate 93 and to completely enclose same a cap cover plate 169 is pivoted to plate 93 at 170 (see Fig. 2) and normally held closed by a spring clip 171 centrally secured to the cover 169 at 172 and having one end 173 adapted to resiliently engage under a boss 174 on the plate 93. The other end of the spring clip 171 extends toward the pivot 170 and is connected to a spring 175 coiled about the pivot 170 which spring 175 resiliently acts on the cover 169 through the spring clip 171 and connection 172 to tend to close the cover 169.

In operation the spring 131 acts against the dished member 142 which in turn acts against the pin 141 and this acts against the spindle 138 which through the member 137 thereon acts against the arms 136 of the centrifugal members 135 to tend to maintain them in the position shown in Fig. 1. When the turbine wheel tends to exceed the speed at which it is desired the generator should be driven the centrifugal members 135 swing outward by the centrifugal action overcoming the opposing action of the spring 131. This causes the spindle 138 to move to the left as viewed in Fig. 1 carrying with it the parts on the end of the spindle so as to rock the lever 156 and move the valve 106 in a direction to cut down the supply of steam to the turbine and so maintain the speed of the generator substantially constant.

By reason of the pin and slot connection between the spindle 138 and the sleeve 139 which is connected to the sleeve 57 the first rotates with the last as do also the parts screwed on the end of the spindle. The member 146, however, being connected to the lever 156 does not rotate and to reduce friction between these rotating and non-rotating parts, the anti-friction carbon rings are interposed. To adjust the position of the valve 106 with respect to the lever 156 it is only necessary to turn the screw 165 in one direction or the other in the arm 164. This screw is held in adjusted position by a spring detent 176 engaging a pin 177 in the end of the screw 165.

Figure 2:
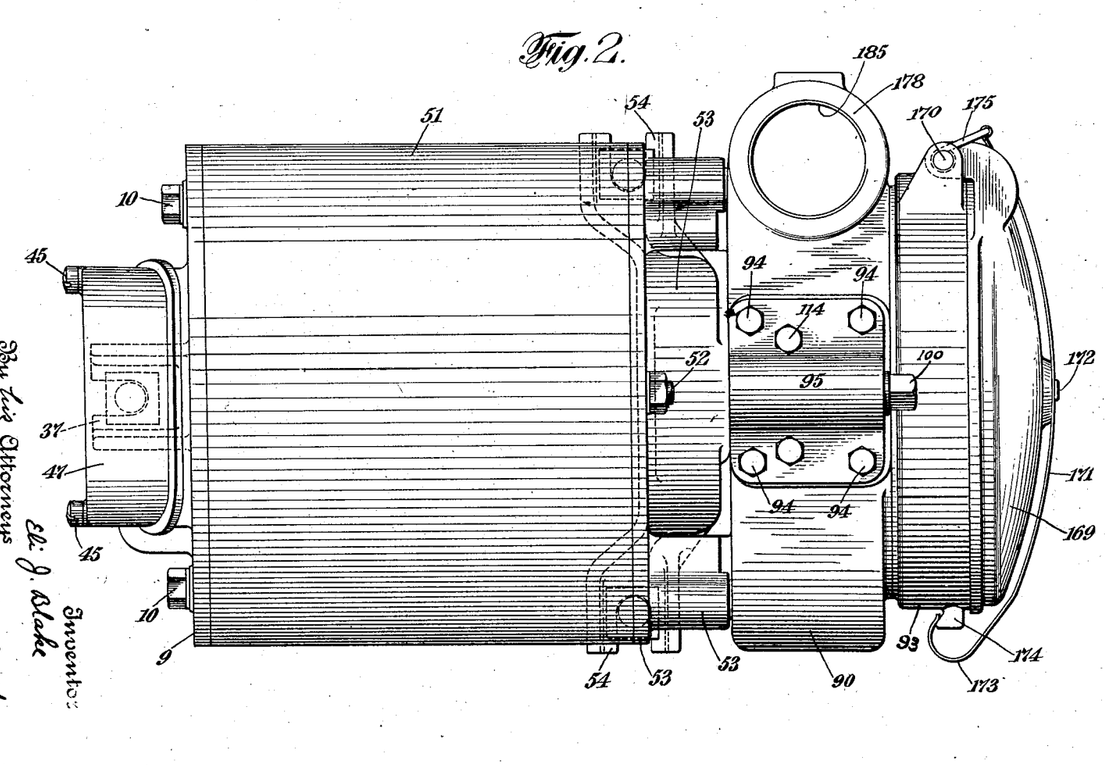
Fig. 2 is a top plan view of the same.
Figure 3:
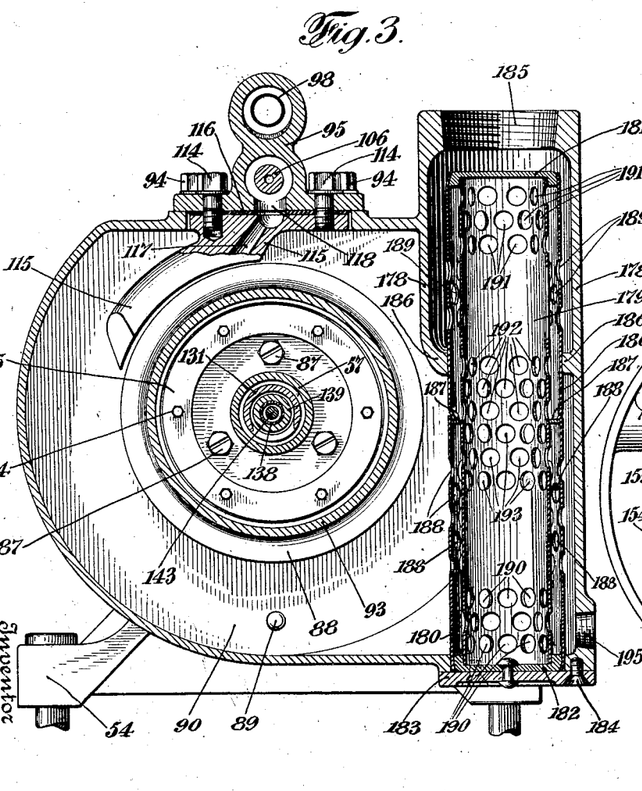
Fig. 3 is a section taken on the line 3—3 of Fig. 1.

Integral with the turbine housing 90 is a muffler chamber 178 (see Figs. 2 and 3). This chamber is vertically arranged and is cylindrical and at the lower part thereof is open to the turbine chamber in which the rim of the turbine wheel rotates so as to provide an inlet to the muffler for the exhaust steam from the turbine. Axially arranged in the muffler chamber are two concentric perforated cylinders 179 and 180 closed at their ends by members 181 and 182. The plate 90 is provided with an opening at the bottom of the muffler chamber, through which opening the cylinders 179 and 180 may be inserted. This opening is normally closed by a plate 183 and the end piece 182 to which it is secured. To hold the parts in place the plate 183 is rigidly secured to the frame 90 by screws 184. The muffler chamber is provided with an exhaust steam outlet 185 at the top. The chamber is provided with a centrally disposed internal circular wall 186, extending closely adjacent and fitting the outer cylinder 180. A centrally disposed transverse wall 187 is fixed between the cylinders 179 and 180 extending across the space between the same. The cylinder 179 is provided with a set of perforations 188 extending around the periphery of the cylinder centrally of the lower half of the cylinder. It is also provided with a set of perforations 189 extending around the periphery of the cylinder centrally of the upper half of the cylinder. The cylinder 179 is provided with a set of perforations 190 extending around the periphery thereof at the lower end of the cylinder, and a set of perforations 191 extending around the periphery thereof at the top of the cylinder and also a set of perforations extending around the periphery of the cylinder centrally thereof, part of which at 192 are above the wall 187 and part of which at 193 are below the wall 187.

The exhaust steam from the turbine first passes through the perforations 188 into the space between the lower portions of the cylinders. It then passes into the lower half of the cylinder 179, partly through the perforations 193 and partly through the perforations 190. The exhaust steam then passes upwardly in the cylinder 179 into the upper half thereof and then into the space between the cylinders partly through the perforations 192 and partly through the perforations 191. It then passes from the space through the perforations 189 into the space in the muffler chamber around the upper portion of the cylinders, from which it passes into the atmosphere through the exhaust opening 185. By this staggered arrangement of apertures in the cylinders part of the exhaust steam is caused to travel a greater distance than other parts in reaching the center of the cylinder 179 and also again in reaching the space around the top of the cylinders so that the puffs of steam are substantially neutralized and the sound ordinarily produced by such an exhaust is effectively muffled. An opening 195 at the bottom is normally piped for drainage.

From the above it will be clear that I have provided an extremely compact and efficient apparatus for the purposes described; one in which the lubrication of the bearings is effectively taken care of and yet, the bearings are readily accessible for inspection, repair or replacement, also one in which the governor and its valve and the muffler are more effectively and efficiently combined with the rest, and one in which the various governor, valve, muffler and turbine parts are easily separated for inspection, repair or replacement.

While I have described my improvements in great detail and with respect to a preferred form thereof, I do not desire to be limited to such details or form since many changes and modifications may be made and the improvements embodied in widely different forms without departing from the spirit and scope of the improvements in their broader aspects. I therefore desire to cover all forms coming within the language or scope of any one or more of the appended claims.

What I claim as new and desire to secure by Letters Patent, is:

1. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, and a bearing for the shaft carried on said sleeve.

2. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, a bearing for the shaft carried on said sleeve, and means holding said bearing fixed axially on the sleeve.

3. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, a bearing for the shaft carried on said sleeve, means holding said bearing fixed axially on the sleeve, and a frame unit carrying said bearing and turbine, said frame unit being removably secured to the generator frame, whereby upon removal of said unit the turbine, said bearing and said sleeve are removed therewith.

4. A turbine generator set having a generator and its shaft, a turbine with its wheel connected to drive said shaft, a sleeve on one end of said shaft, said sleeve being fixed to rotate with the shaft but being slidable axially of the shaft, a bearing assembly for the shaft, said bearing including raceways carried on said sleeve, said sleeve having an abutment for holding the bearing on one side and a nut screw threaded on one end of the sleeve for holding the bearing on the other side thereof, and frame members removably secured to the generator frame and enclosing said bearing.

5. A turbine generator set having a generator and its shaft, a turbine and its wheel connected to drive the shaft, a sleeve on one end of the shaft, said sleeve being fixed to rotate with the shaft but free to slide axially thereof and the turbine wheel being secured to said sleeve, a bearing assembly for the shaft including raceways carried on said sleeve, separable frame members removably secured to the generator frame and enclosing said bearing assembly an oil well in one of said frame members, means for transmitting oil from said well to the bearing, and means for holding the bearing in fixed axial position on said sleeve independently of said frame members.

6. A turbine generator set having a generator and its shaft, a turbine and its wheel connected to drive the shaft, a sleeve on one end of the shaft, said sleeve being fixed to rotate with the shaft but free to slide axially thereof, a bearing assembly for the shaft including raceways carried on said sleeve, separable frame members removably secured to the generator frame and enclosing the bearing, and means for holding the bearing in fixed axial position on said sleeve independently of said frame members.

7. A turbine generator set having a generator and its shaft, a sleeve extending over one end of the shaft and connected to rotate therewith, a turbine wheel secured on said sleeve to rotate the shaft, said sleeve extending beyond the end of said shaft, a governor spring in the extension of said sleeve, and a centrifugal governor carried at the end of said sleeve for controlling the admission of steam to the turbine wheel.

8. A turbine generator set having a generator and its shaft, a sleeve extending over one end of the shaft and connected to rotate therewith, a turbine wheel secured to rotate the shaft, said sleeve extending beyond the end of said shaft, a governor spring in the extension of said sleeve, and a centrifugal governor cooperating with said spring for controlling the admission of steam to the turbine wheel, said turbine wheel being on the same side of the generator as the governor.

9. A turbine generator set having a generator and its shaft, a sleeve extending over one end of the shaft and connected to rotate therewith, a turbine wheel connected to rotate the shaft, said sleeve extending beyond said shaft, a fulcrum member attached to the outer end of said sleeve, centrifugal members fulcrumed on said fulcrum member, a spindle extending through said fulcrum member, means on said spindle and engaged by said centrifugal members to operate the spindle, a spring in said sleeve and acting on said spindle in opposition to centrifugal members, and means whereby movement of said spindle controls the flow of steam to the turbine wheel.

10. A turbine generator set having a generator and its shaft, a sleeve extending over one end of the shaft and connected to rotate therewith, a turbine wheel connected to rotate the shaft, said sleeve extending beyond said shaft, a fulcrum member attached to the outer end of said sleeve, centrifugal members fulcrumed on said fulcrum member, a spindle extending through said fulcrum member, means on said spindle and engaged by said centrifugal members to operate the spindle, a spring in said sleeve and acting on said spindle in opposition to centrifugal members, and means whereby movement of said spindle controls the flow of steam to the turbine wheel, said fulcrum member having a slotted sleeve within which the spindle reciprocates and around which the spring is located and a member extending through the spindle and the slotted portion of the slotted sleeve to form an abutment for one end of the spring.

11. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, a bearing for the shaft carried on said sleeve, and housing members forming a housing chamber for the turbine wheel, which chamber has an opening therethrough through which the shaft extends, and which opening is substantially larger in diameter than the shaft, the walls of said opening having a circular slot therethrough, through which the turbine wheel extends radially so that its periphery will be rotatable in the chamber.

12. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, a bearing for the shaft carried on said sleeve, and housing members forming a housing chamber for the turbine wheel, which chamber has an opening therethrough through which the axis of the shaft extends, and which opening is substantially larger in diameter than the shaft, the walls of said chamber having an opening therethrough, through which the turbine wheel extends so that its periphery will be rotatable in the chamber, and means carried by the wheel and creating a pressure at said last mentioned opening tending to prevent the escape of steam through said opening.

13. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, a bearing for the shaft carried on said sleeve, and housing members forming a housing chamber for the turbine wheel, which chamber has an opening therethrough through which the axis of the shaft extends, and which opening is substantially larger in diameter than the shaft, the walls of said opening having a circular slot therethrough, through which the turbine wheel extends so that its periphery will be rotatable in the chamber, and said housing means also providing a governor chamber adjacent said first chamber, and a centrifugal governor in said governor chamber and connected to the end of said shaft and acting to control the admission of steam to the turbine wheel.

14. A turbine generator set having a generator and its shaft, a turbine and its wheel driving said shaft, a sleeve on one end of said shaft on which sleeve said wheel is secured, said sleeve being fixed to rotate with the shaft but slidable axially of the shaft, a bearing for the shaft carried on said sleeve, and housing members forming a housing chamber for the turbine wheel, which chamber has an opening therethrough through which the axis of the shaft extends, and which opening is substantially larger in diameter than the shaft, the walls of said chamber having an opening therethrough, through which the turbine wheel extends so that its periphery will be rotatable in the chamber, and means carried by the wheel and creating a pressure at said last mentioned opening tending to prevent the escape of steam through said opening, and said housing means also providing a governor chamber adjacent said first chamber, and a centrifugal governor in said governor chamber and connected to the end of said shaft, a valve carried by said housing and controlled by said governor and acting to control the admission of steam to the turbine wheel.

In testimony whereof I have signed my name to this specification.

ELI J. BLAKE.